(12) United States Patent
Mukaida et al.

(10) Patent No.: US 11,952,089 B2
(45) Date of Patent: Apr. 9, 2024

(54) WORKING METHOD USING AUTONOMOUS UNDERWATER VEHICLE

(71) Applicant: KAWASAKI JUKOGYO KABUSHIKI KAISHA, Kobe (JP)

(72) Inventors: Minehiko Mukaida, Kobe (JP); Noriyuki Okaya, Kobe (JP); Koichi Fukui, Akashi (JP); Fumitaka Tachinami, Kobe (JP); Yuki Kaga, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 773 days.

(21) Appl. No.: 17/049,824

(22) PCT Filed: Apr. 26, 2019

(86) PCT No.: PCT/JP2019/017880
§ 371 (c)(1),
(2) Date: Oct. 22, 2020

(87) PCT Pub. No.: WO2019/208757
PCT Pub. Date: Oct. 31, 2019

(65) Prior Publication Data
US 2021/0362816 A1    Nov. 25, 2021

(30) Foreign Application Priority Data
Apr. 26, 2018   (JP) .................. 2018-085821

(51) Int. Cl.
*B63G 8/00*   (2006.01)
*B63C 11/48*  (2006.01)
*G01S 5/18*   (2006.01)

(52) U.S. Cl.
CPC .............. *B63G 8/001* (2013.01); *B63C 11/48* (2013.01); *G01S 5/18* (2013.01); *B63G 2008/004* (2013.01); *B63G 2008/007* (2013.01)

(58) Field of Classification Search
CPC ................ G05D 1/10; B63G 2007/005; B63G 2008/004; B63G 8/001; B63G 2008/008;
(Continued)

(56) References Cited

U.S. PATENT DOCUMENTS 4,229,809 A * 10/1980 Schwalbe ............... G01S 15/74
                                                               367/106
5,844,159 A * 12/1998 Posseme .................. B63G 7/02
                                                                89/1.13
(Continued)

FOREIGN PATENT DOCUMENTS

CN        106965179 A  *  7/2017
GB         2125965 A  *  3/1984   ........... G01S 15/874
(Continued)

*Primary Examiner* — David A Testardi
(74) *Attorney, Agent, or Firm* — Oliff PLC

(57) ABSTRACT

A working method using an AUV includes a step of working on a work object with a work device included in the AUV while causing the AUV to sail along the work object, a step of dropping and sinking a transponder to the bottom of water, a step of causing the AUV to sail toward a return destination, and a step of resuming work on the work object by causing the AUV to sail from a return destination to the vicinity of a work suspended position, at which work on the work object is suspended, based on information obtained by acoustic positioning using the transponder that is sunk to the bottom of water.

5 Claims, 8 Drawing Sheets

(58) Field of Classification Search
CPC ... B63G 2008/007; G01S 15/876; G01S 5/18;
Y02A 90/30; B63C 11/48
See application file for complete search history.

(56) References Cited

U.S. PATENT DOCUMENTS

| | | | | |
|---|---|---|---|---|
| 5,894,450 | A * | 4/1999 | Schmidt | H04B 13/02 367/133 |
| 6,819,984 | B1 * | 11/2004 | Bedckman | G01S 15/74 367/130 |
| 8,205,570 | B1 * | 6/2012 | Tureaud | B63G 8/14 114/330 |
| 10,450,041 | B2 | 10/2019 | Kimura et al. | |
| 2003/0078706 | A1 * | 4/2003 | Larsen | G01C 21/1652 701/494 |
| 2005/0077902 | A1 * | 4/2005 | MacGregor | G01V 3/083 324/334 |
| 2006/0129322 | A1 * | 6/2006 | MacGregor | G01V 3/083 702/13 |
| 2008/0144442 | A1 * | 6/2008 | Combee | G01V 1/22 367/131 |
| 2009/0095209 | A1 * | 4/2009 | Jamieson | B63G 8/001 114/312 |
| 2010/0061187 | A1 * | 3/2010 | Sodal | G01V 1/001 367/131 |
| 2011/0297070 | A1 * | 12/2011 | Riggs | B63H 25/42 114/330 |
| 2012/0134236 | A1 * | 5/2012 | Pearce | G01S 15/872 367/118 |
| 2012/0243375 | A1 * | 9/2012 | Melvin, II | G01S 15/876 367/118 |
| 2014/0012434 | A1 * | 1/2014 | Spence | G01S 15/872 701/16 |
| 2014/0230713 | A1 * | 8/2014 | Kimura | B63G 8/001 114/313 |
| 2014/0232200 | A1 * | 8/2014 | Maekawa | G01N 33/1886 307/104 |
| 2014/0300885 | A1 * | 10/2014 | Debrunner | G01S 17/42 356/4.01 |
| 2015/0092178 | A1 * | 4/2015 | Debrunner | G01S 17/42 356/4.01 |
| 2015/0276916 | A1 * | 10/2015 | Melvin, II | G01S 3/8083 367/125 |
| 2016/0124105 | A1 * | 5/2016 | Valsvik | B63G 8/001 367/15 |
| 2017/0077759 | A1 * | 3/2017 | Niizuma | B60L 5/005 |
| 2017/0328982 | A1 * | 11/2017 | Jongsma | G01S 5/16 |
| 2018/0120442 | A1 * | 5/2018 | Powe | G01S 19/44 |
| 2018/0304977 | A1 * | 10/2018 | Grant | B63G 8/001 |
| 2018/0319463 | A1 * | 11/2018 | Grant | B63G 8/001 |
| 2019/0283848 | A1 * | 9/2019 | Guevel | B63G 8/24 |
| 2019/0317235 | A1 * | 10/2019 | Lyssy | G01V 1/3852 |
| 2022/0073175 | A1 * | 3/2022 | Mukaida | B63G 8/08 |

FOREIGN PATENT DOCUMENTS

| | | | |
|---|---|---|---|
| JP | 03266794 | A * | 11/1991 |
| JP | 08138200 | A * | 5/1996 |
| JP | 2898050 | B2 | 5/1999 |
| JP | 2003026090 | A * | 1/2003 |
| JP | 4779810 | B2 | 9/2011 |
| JP | 2011170575 | A * | 9/2011 |
| JP | 5806568 | B2 | 11/2015 |
| JP | 2016-526148 | A | 9/2016 |

* cited by examiner

[Fig. 1]
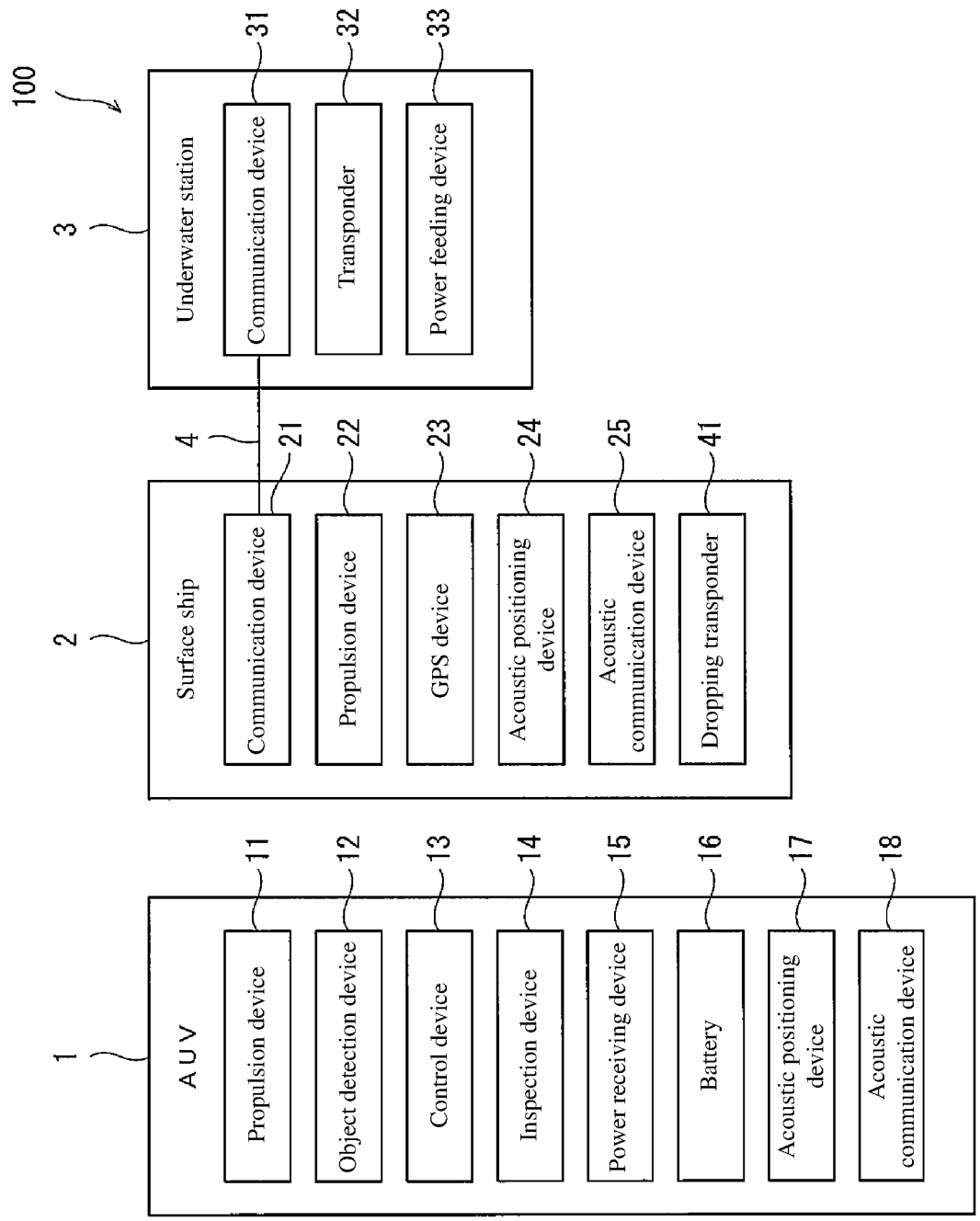

[Fig. 2]
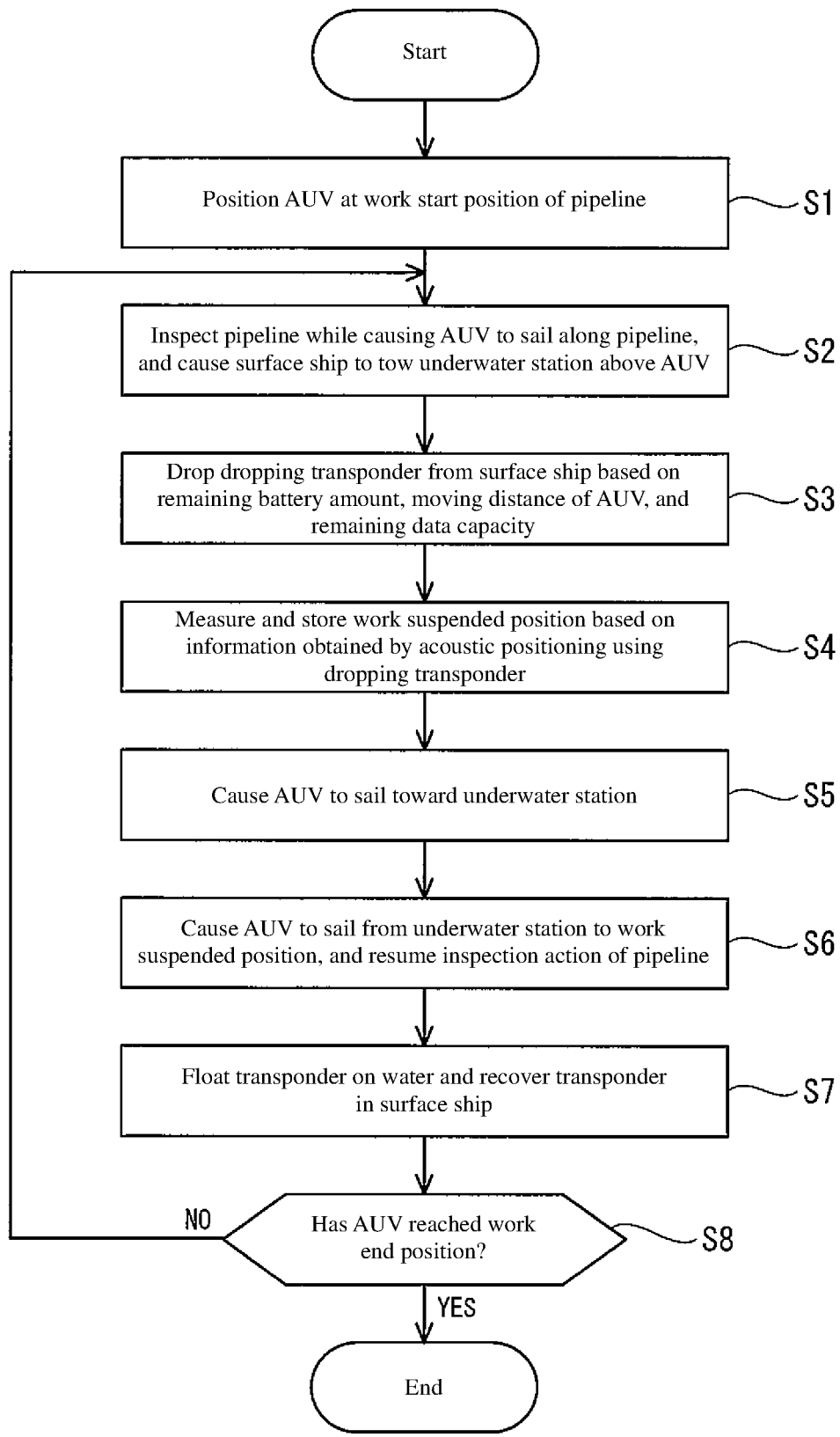

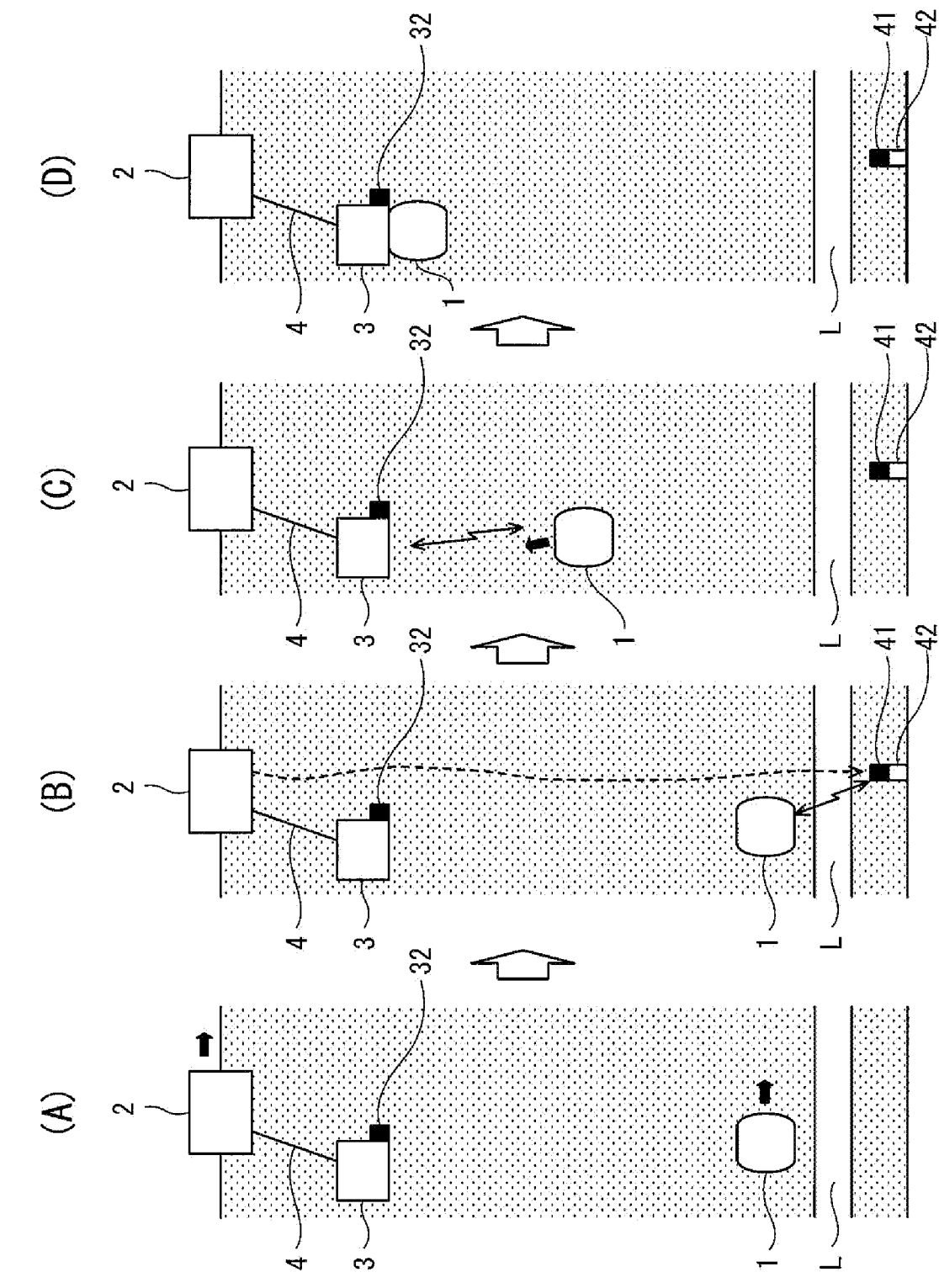
[Fig. 3]

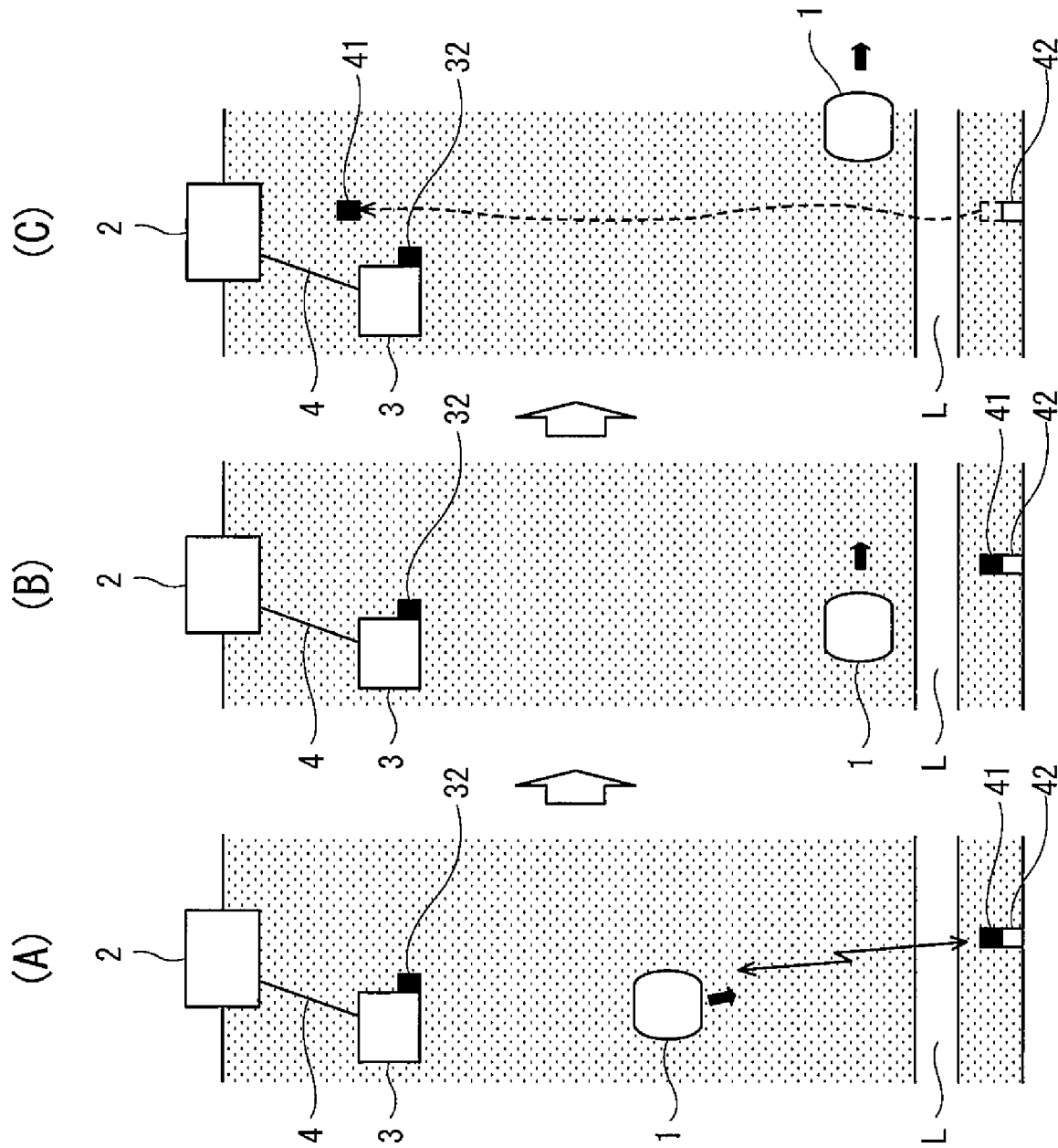
[Fig. 4]

[Fig. 5]
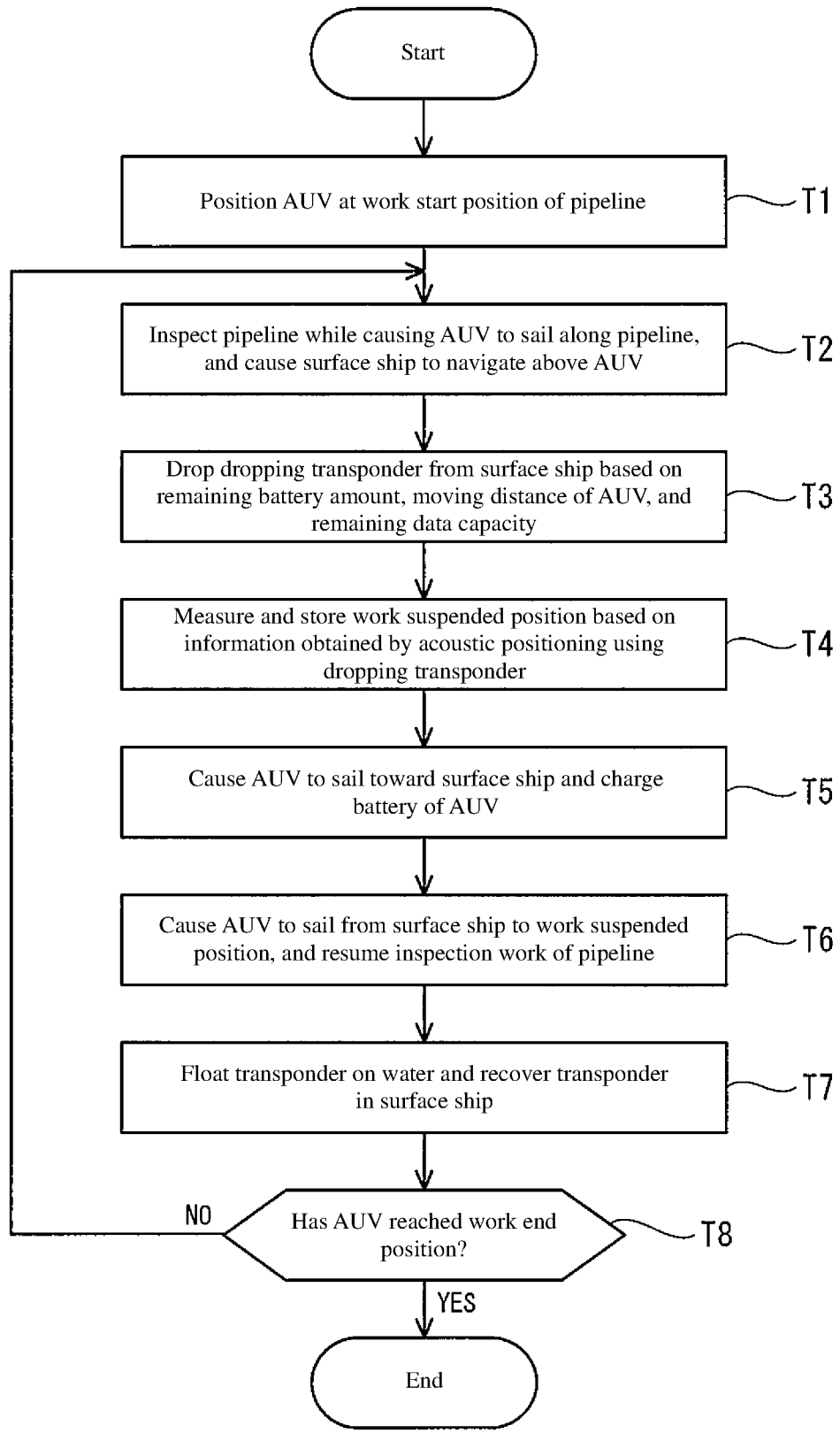

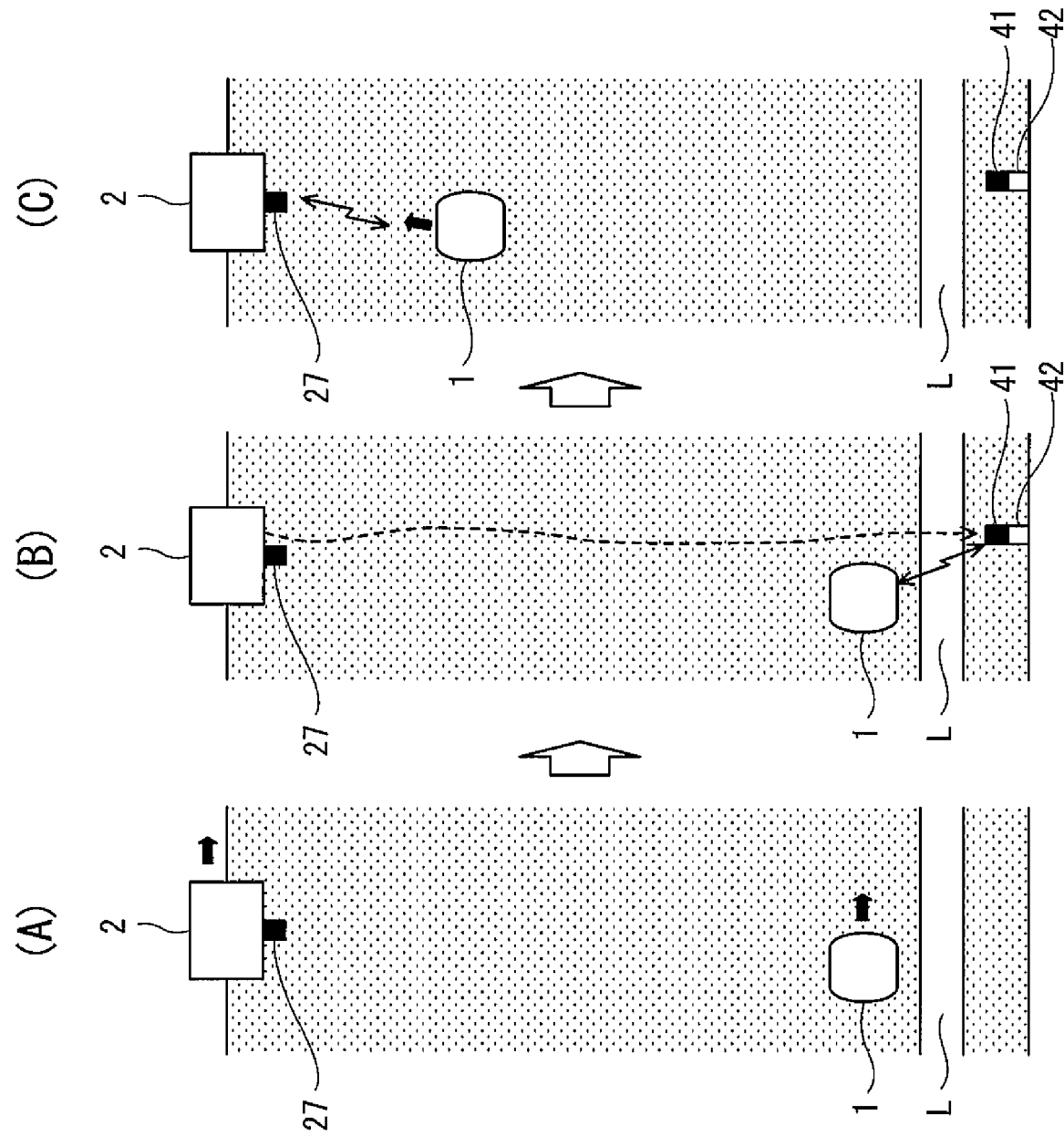

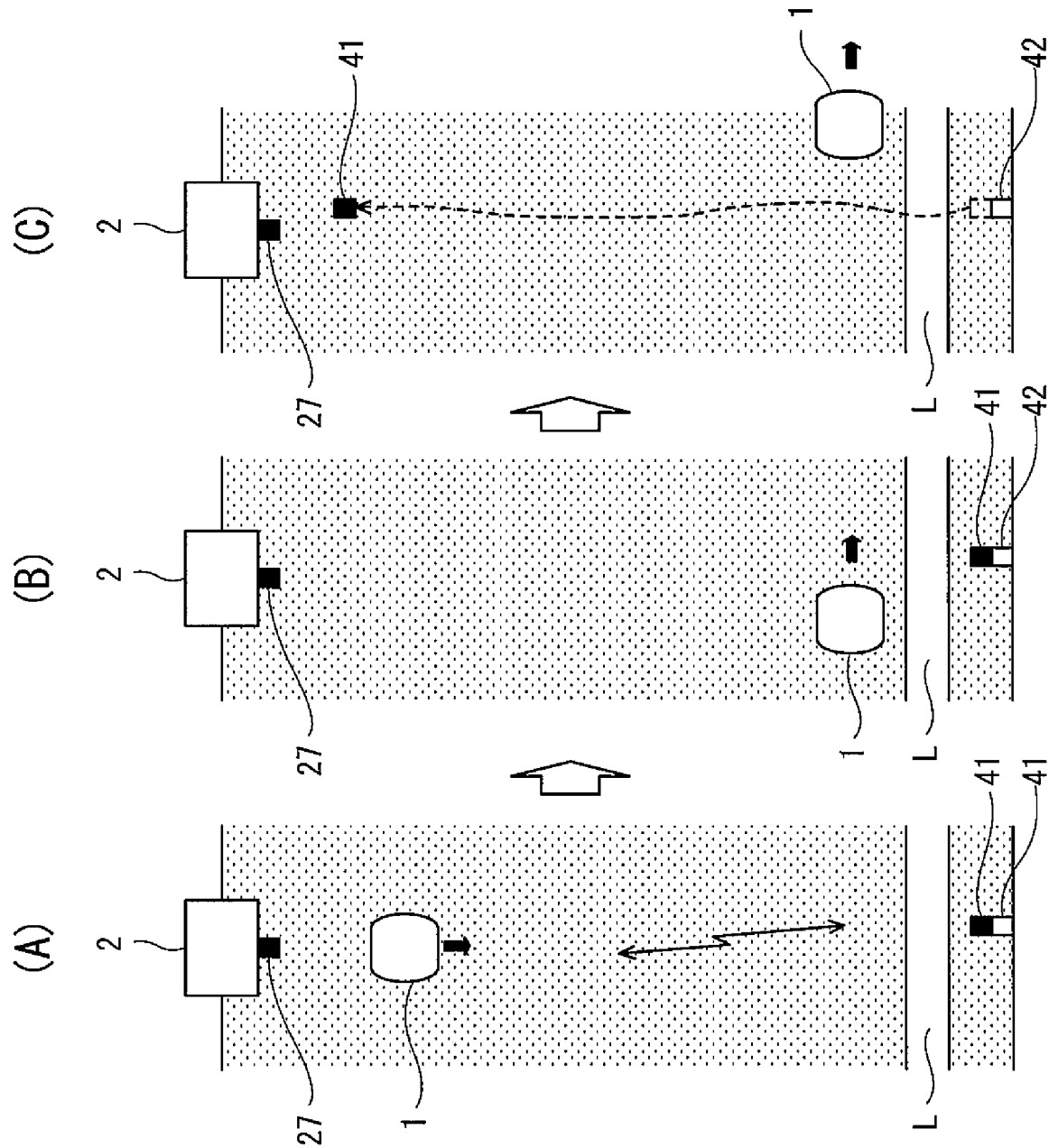

[Fig. 8]
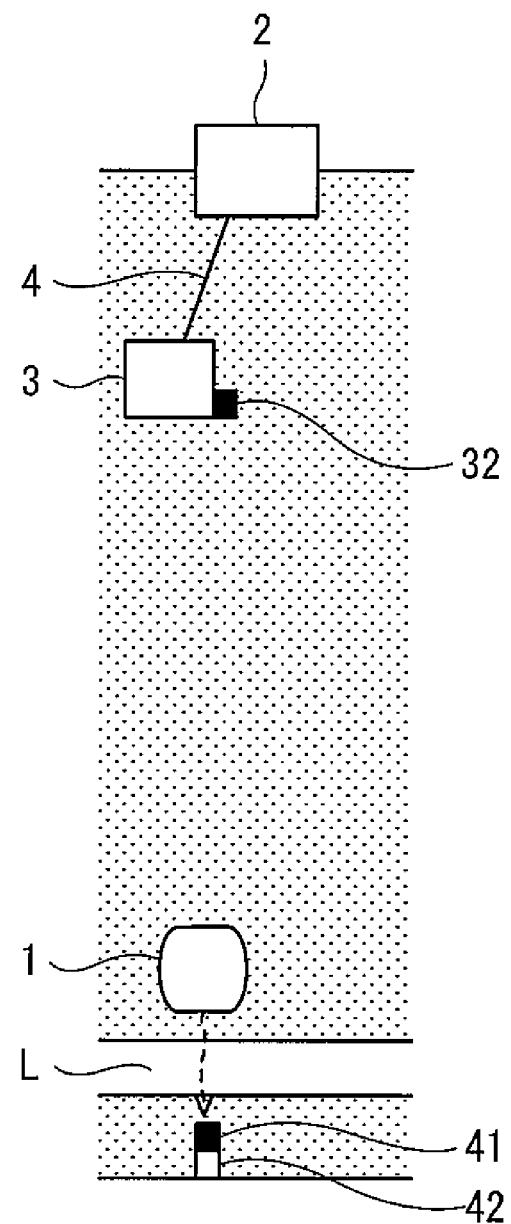

WORKING METHOD USING AUTONOMOUS UNDERWATER VEHICLE

TECHNICAL FIELD

The present invention relates to a working method for, for example, inspection or the like, using an autonomous underwater vehicle.

BACKGROUND ART

For example, as a device for performing underwater work, such as inspection of a submarine pipeline laid on the sea floor and creation of a bathymetric chart, an autonomous underwater vehicle (AUV) (hereinafter also referred to as AUV) that autonomously sails underwater using a built-in battery as a power source has been advanced in development (see, for example, PTL 1).

CITATION LIST

Patent Literature

PTL 1: Japanese Patent No. 5806568

SUMMARY OF INVENTION

Technical Problem

In a case where underwater work is performed using an AUV, a situation of causing the AUV to suspend the work and temporarily return to a surface ship or an underwater station is assumed for various reasons, such as charging of a built-in battery of the AUV, checking of data acquired by the AUV until the stage of the suspension of the work, replacement of a work device included in the AUV, or the like. In this case, the work is advanced while reciprocating the AUV between the work object and the return destination.

As a method for causing the AUV to sail from the return destination to the vicinity of the work suspended position of the work object, a position and a direction of the AUV before the return (that is, a position and a direction of the AUV that suspends the work) are considered to be measured by an inertial navigation system (INS) mounted on the AUV, so as to cause the AUV to return to the measured position from the return destination. However, measured errors are accumulated in the position information of the inertial navigation system over time. For this reason, by position measurement using the inertial navigation system, it is extremely difficult to cause the AUV to accurately sail from the return destination to the vicinity of the work suspended position of the work object.

In view of the above, an object of the present invention is to provide a working method using an AUV for working on a work object located underwater or at the bottom of water while reciprocating the AUV between the work object and a return destination, in which the AUV can be caused to sail with high accuracy from the return destination to the vicinity of a work suspended position of the work object.

Solution to Problem

In order to solve the above problem, according to the present invention, there is provided a working method using an AUV for working on a work object located underwater or at a bottom of water by using the AUV while reciprocating the AUV between the work object and a return destination.

The working method includes: a step of working on the work object with a work device included in the AUV while causing the AUV to sail along the work object; a step of dropping and sinking a transponder to the bottom of water; a step of causing the AUV to sail toward the return destination; and a step of resuming work on the work object by causing the AUV to sail from the return destination to a vicinity of a work suspended position, at which the work on the work object is suspended, based on information obtained by acoustic positioning using the transponder that is sunk to the bottom of water.

According to the above working method, the AUV is caused to sail toward the return destination after the transponder is dropped and sunk to the bottom of water, and the AUV is caused to sail from the return destination to the vicinity of the work suspended position based on the information obtained by the acoustic positioning using the transponder. For this reason, the AUV can be caused to accurately sail from the return destination toward the vicinity of the work suspended position of the work object.

In the above working method, in the step of dropping the transponder, the dropping may be performed toward a vicinity of a position at which the work is scheduled to be suspended or a vicinity of a position at which work is suspended. According to this working method, the AUV can be caused to easily sail to the vicinity of the work suspended position by causing the AUV to sail from the return destination to the transponder at the bottom of water.

The above working method may include a step of storing a work suspended position at which the work on the work object is suspended based on information obtained by acoustic positioning using the transponder that is sunk to the bottom of water, prior to the step of causing the AUV to sail toward the return destination. According to this working method, even in a case where the position where the transponder reaches the bottom is away from the work suspended position, the AUV can be caused to sail from the return destination to the vicinity of the work suspended position.

The above working method may include a step of towing an underwater station as the return destination by a surface ship that navigates above the AUV, and, in the step of dropping the transponder, the transponder may be dropped from the surface ship, the underwater station, or the AUV.

In the above working method, in the step of dropping the transponder, the transponder is dropped when at least one of the following conditions (i) to (iii) is satisfied:
 (i) when the remaining battery amount of the AUV falls below a set value;
 (ii) when the moving distance of the AUV exceeds a predetermined distance; and
 (iii) when the remaining data capacity that can be stored by the AUV falls below a set amount in a case where work performed by the AUV includes storing of predetermined data.

The above working method may include a step of floating the transponder on the water, after the step of resuming the work on the work object. According to this working method, the transponder that is sunk to the bottom of water is floated on the water after the work on the work object is resumed. For this reason, the transponder can be recovered from the surface ship.

Advantageous Effects of Invention

According to the present invention, it is possible to provide a working method using an AUV for working on a work object located underwater or at the bottom of water while reciprocating the AUV between the work object and a return destination, in which the AUV can be caused to sail with high accuracy from the return destination to the vicinity of a work suspended position of the work object.

BRIEF DESCRIPTION OF DRAWINGS

FIG. 1 is a schematic configuration diagram of a working system that performs a working method according to a first embodiment.

FIG. 2 is a flowchart showing a process of pipeline inspection in the working method according to the first embodiment.

FIG. 3 is a schematic diagram for describing a process in which an AUV sails from a work suspended position toward an underwater station in the working method according to the first embodiment.

FIG. 4 is a schematic diagram for describing a process in which the AUV sails from the underwater station to the work suspended position and resumes the inspection in the working method according to the first embodiment.

FIG. 5 is a flowchart showing a process of pipeline inspection in a working method according to a second embodiment.

FIG. 6 is a schematic diagram for describing a process in which an AUV sails from a work suspended position toward a surface ship in the working method according to the second embodiment.

FIG. 7 is a schematic diagram for describing a process in which the AUV sails from the surface ship to the work suspended position and resumes the inspection in the working method according to the second embodiment.

FIG. 8 is a schematic diagram showing a dropping transponder from an AUV in a working method according to a modification.

DESCRIPTION OF EMBODIMENTS

First Embodiment

Hereinafter, a working method according to a first embodiment of the present invention will be described with reference to the drawings.

Configuration of Working System

FIG. 1 is a schematic configuration diagram of a working system 100 that performs the working method according to the first embodiment. The working system 100 of the present embodiment includes an AUV 1, a surface ship 2, and an underwater station 3. The working system 100 of the present embodiment is a system that performs inspection work using the AUV 1 over the entire length of, for example, a submarine pipeline (hereinafter referred to as a "pipeline") L (see FIGS. 3 and 4) laid over several tens or hundreds of kilometers on the sea floor.

The AUV 1 inspects the pipeline L by sailing along the pipeline L. The AUV 1 has a body (not shown). The body of the AUV 1 is provided with a propulsion device 11, an object detection device 12, an inspection device 14, a power receiving device 15, a battery 16, an acoustic positioning device 17, and an acoustic communication device 18.

The propulsion device 11 generates a thrust that moves the body of the AUV 1 in water. The propulsion device 11 includes a plurality of propellers, for example, a main thruster for moving the body of the AUV 1 forward, a vertical thruster for moving the AUV 1 body in the vertical direction, a horizontal thruster for moving the AUV 1 body in the lateral direction, and the like, and a rudder for changing the course of the AUV 1. However, the propulsion device 11 is not limited to this, and may have, for example, a swinging thruster capable of changing the direction in which a thrust is generated.

The object detection device 12 detects the pipeline L, which is a work object, and acquires work object information indicating a positional relationship between the body of the AUV 1 located in the vicinity of the pipeline L and the pipeline L. Then, a control device 13 controls the propulsion device 11 based on the work object information that is acquired by the object detection device 12, so that the AUV 1 sails along the pipeline L while maintaining a state in which the body of the AUV 1 is within a certain range with respect to the pipeline L.

The object detection device 12 is a multi-beam sonar, for example. The object detection device 12 is provided, for example, in a front lower part of the body of the AUV 1, and acquires information regarding a bending state of the pipeline L in a middle distance in front of the AUV 1 and the presence or absence of a foreign matter on the pipeline L as the work object information. However, the object detection device 12 does not need to be a multi-beam sonar, and may be any device as long as the device can acquire information that enables the AUV 1 to sail while following the pipeline L. For example, the object detection device 12 may be a shape grasping laser, or may include both a multi-beam sonar and a shape grasping laser. Further, the position and the number of the object detection devices 12 provided are not particularly limited.

The inspection device 14 is a device for inspecting the pipeline L that is a work object. In the present embodiment, the inspection device 14 is an imaging camera (for example, a television camera) that captures an upper surface or a side surface of the pipeline L. The body of the AUV 1 is provided with a movable arm controlled by the control device 13 described above, and the inspection device 14 is provided at a tip of the movable arm. Video data captured by an imaging camera serving as the inspection device 14 is used as inspection data (work data) for visual inspection by an operator. The inspection device 14 corresponds to the "work device" of the present invention.

Note that the inspection device 14 is not limited to an imaging camera. The inspection device 14 may include, instead of or in addition to the imaging camera, one or both of an anti-corrosion inspector that inspects the degree of deterioration of anti-corrosion treatment (for example, anti-corrosion coating), for example, over the entire length of the pipeline L, and a thickness inspector that inspects a thickness of the pipeline L in order to inspect the degree of corrosion and the presence or absence of damage.

Note that, in the description and claims of the present application, the work performed by the AUV includes acquisition of inspection data (work data) for the operator to check the degree of deterioration of the work object and the presence or absence of abnormality. That is, the AUV itself may, or does not need to, determine the degree of deterioration of the work object, the presence or absence of abnormality, and the like.

The power receiving device 15 receives power supplied from a power feeding device 33 (described later) of the underwater station 3. The battery 16 is charged based on the power received by the power receiving device 15. The power stored in the battery 16 is used to operate the above-described elements, such as the propulsion device 11, provided in the AUV 1.

The acoustic positioning device 17 constitutes an acoustic positioning system that measures a relative position of the AUV 1 with respect to a dropping transponder 41 or a transponder 32 described later together with the dropping transponder 41 or the transponder 32. Details of the acoustic positioning device 17 will be described later.

The acoustic communication device 18 communicates, by using a sound, with an acoustic communication device 25 (described later) included in the surface ship 2. By using the acoustic communication device 18, information (for example, the position of the AUV 1, a heading of the AUV 1, a remaining amount of the battery 16, and the like) acquired by various devices included in the AUV 1 can be transmitted to the surface ship 2 from the AUV 1. Transmission or reception of a work suspension signal, which will be described later, is also performed by the acoustic communication device 18 or the acoustic communication device 25. Note that the acoustic positioning device 17 and the acoustic communication device 18 may be configured integrally or may be separate.

In the present embodiment, the surface ship 2 is a maritime support vessel that sails above the AUV 1 on the sea and supports the AUV 1 as appropriate. Specifically, the surface ship 2 is towing the underwater station 3 above the pipeline L on the sea. Then, the underwater station 3 can be used to supply power to the AUV 1 without lifting the AUV 1 to the surface ship 2.

Note that the surface ship 2 that sails above the AUV 1 on the sea does not have to be positioned directly above the AUV 1, and preferably sails along the pipeline L within a range in which the surface ship 2 can support the AUV 1. Usually, the speed of the surface ship 2 is larger than the AUV 1. For this reason, the surface ship 2 does not always have to navigate while the AUV 1 is sailing. For example, even when the AUV 1 is sailing, the surface ship 2 may repeat navigation and stopping as long as the distance to the AUV 1 is within a range where the surface ship 2 can support the AUV 1.

The surface ship 2 includes a communication device 21, a propulsion device 22, a global positioning system (GPS) device 23, an acoustic positioning device 24, and the acoustic communication device 25. The communication device 21 is a device for communicating with a communication device 31 described later provided in the underwater station 3. The propulsion device 22 is a device that generates a thrust for sailing on the water. The GPS device 23 is a device that acquires position information of the surface ship 2 on the sea.

The acoustic positioning device 24 constitutes an acoustic positioning system that measures a relative position of the surface ship 2 with respect to the dropping transponder 41 or the transponder 32 described later together with the dropping transponder 41 or the transponder 32. Details of the acoustic positioning device 24 will be described later.

The acoustic communication device 25 communicates, by using a sound, with the acoustic communication device 18 described above included in the AUV 1. By using the acoustic communication device 25, information (for example, the position of the AUV 1, a heading of the AUV 1, a remaining amount of the battery 16, and the like) acquired by various devices included in the AUV 1 can be received from the AUV 1. Note that the acoustic positioning device 24 and the acoustic communication device 25 may be configured integrally or may be separate.

Further, the surface ship 2 is mounted with the dropping transponder 41 (corresponding to the "transponder" of the present invention) that can be dropped into the sea. The dropping transponder 41 is for measuring a position at which the AUV 1 suspends the inspection work of the pipeline L (work suspended position) in a case where the AUV 1 needs to suspend the work and return to the underwater station 3 from the vicinity of the pipeline L for charging and the like.

A weight 42 (see FIGS. 3 and 4) is combined with the dropping transponder 41 by, for example, a rope so that the dropping transponder 41 sinks to the sea floor after being dropped into the sea. When the weight 42 reaches the bottom, the position of the dropping transponder 41 with respect to the sea floor, that is, the position of the dropping transponder 41 with respect to the pipeline L becomes constant.

The acoustic positioning device 17 of the AUV 1 at the work suspended position sends a sound wave to the dropping transponder 41 whose position on the sea floor is determined in the above manner. Then, the dropping transponder 41 that has detected the sound wave sends a response wave to the acoustic positioning device 17. Based on the response wave from the dropping transponder 41, the acoustic positioning device 17 measures the position of the AUV 1 relative to the dropping transponder 41, that is, the work suspended position of the pipeline L at which the AUV 1 suspends the work. The measured work suspended position (information) is stored in a storage unit (not shown) of the AUV 1.

Note that the acoustic positioning system in the present embodiment is a positioning system in an ultra short baseline (USBL) system. That is, the acoustic positioning device 17 has a transmitter and a receiving array, sends a sound wave from the transmitter, and receives, by the receiving array, a response wave sent from the dropping transponder 41 that detects the sound wave. The acoustic positioning device 17 calculates the distance to the dropping transponder 41 based on the round-trip time of the sound wave between the acoustic positioning device 17 and the dropping transponder 41, and also identifies the direction of the dropping transponder 41 based on a phase difference in the response sound waves that reach elements in the receiving array. Further, the acoustic positioning device 24 provided in the surface ship 2 also has a configuration employing the USBL system like the acoustic positioning device 17, and thus the description of the acoustic positioning device 24 is omitted.

As described above, the stored work suspended position (information) is preferably information by which the position in the pipeline L at which the AUV 1 suspends the work can be identified, and may be information including the distance (information) from the acoustic positioning device 17 to the dropping transponder 41 and the direction (information) of the dropping transponder 41 with respect to the acoustic positioning device 17 or the direction of the AUV 1 measured in advance. Further, the work suspended position (information) may be coordinate information on a map or the like.

Note that the acoustic positioning system of the present embodiment is not limited to a positioning system of the USBL system. For example, a short baseline (SBL) system, in which the acoustic positioning device 17 identifies the direction of the dropping transponder 41 with respect to the AUV based on a reaching time difference in response waves received by three or more receivers that are provided in the body of the AUV 1 so as to be separated from each other, or the like may be employed.

Further, the dropping transponder 41 is configured to be caused to rise at a predetermined timing and recoverable to the surface ship 2. Specifically, the dropping transponder 41 is provided with a separation device that receives a predetermined acoustic signal and separates the weight 42 from the dropping transponder 41 (that is, releases the combined state of the weight 42 and the dropping transponder 41), and a floating body that floats the dropping transponder 41 separated from the weight 42 on the sea (both not shown).

In the present embodiment, the underwater station 3 is connected to a cable 4 extending from the surface ship 2, and when the surface ship 2 sails on the sea, the underwater station 3 is pulled by the cable 4 and towed. The cable 4 includes a transmission line for sending electricity from the surface ship 2 to the underwater station 3 and a communication line for communicating with the surface ship 2.

The underwater station 3 includes the communication device 31, the transponder 32, and the power feeding device 33. The communication device 31 is a device for communicating with the communication device 21 described above provided in the surface ship 2. The communication device 31 of the underwater station 3 and the communication device 21 of the surface ship 2 communicate via the cable 4. However, the communication device 31 of the underwater station 3 and the communication device 21 of the surface ship 2 may communicate by radio.

The transponder 32 is for the acoustic positioning device 17 to measure the position of the AUV 1 with respect to the underwater station 3 in order for the AUV 1 to approach the underwater station 3. In a case where the AUV 1 has to suspend the work for charging and the like and return to the underwater station 3 from the vicinity of the pipeline L, the acoustic positioning device 17 sends a sound wave to the transponder 32, and the transponder 32 that detects the sound wave sends a response wave to the acoustic positioning device 17. The acoustic positioning device 17 measures the position of the AUV 1 with respect to the transponder 32 based on the response wave from the transponder 32. The control device 13 controls the propulsion device 11 so that the AUV 1 approaches the transponder 32.

The power feeding device 33 supplies power to the power receiving device 15 of the AUV 1. In the present embodiment, the underwater station 3 is configured to be dockable with the AUV 1. When the AUV 1 approaches the underwater station 3 and is docked with the underwater station 3, the power can be supplied from the power feeding device 33 of the underwater station 3 to the power receiving device 15 of the AUV 1. In the present embodiment, the power feeding device 33 is a power feeding device of a non-contact system that supplies power to the power receiving device 15 in a non-contact manner. However, the power feeding device 33 may be a power feeding device of a contact system that supplies power via a connector or the like that connects the underwater station 3 and the AUV 1.

Process of Work Using AUV

Next, the process of inspection work for the pipeline L by the working method according to the present embodiment will be described with reference to FIGS. 2 to 4. FIG. 2 is a flowchart showing a process of inspection of the pipeline L by the working method according to the present embodiment. FIG. 3 is a schematic diagram explaining a process in which the AUV 1 sails from the work suspended position toward the underwater station 3. FIG. 4 is a schematic diagram explaining a process in which the AUV 1 sails from the underwater station 3 to the work suspended position and resumes the inspection work.

As shown in FIG. 2, in the working method according to the present embodiment, first, the AUV 1 is positioned at the work start position where the inspection work of the pipeline L is started (Step S1).

Here, an example of a method of positioning the AUV 1 at the work start position of the pipeline L will be described. In the inspection work of the pipeline, a map showing at which position the pipeline L is located (hereinafter referred to as "pipeline map") is prepared, and the work start position and a work end position of the pipeline L are determined in advance. At the start of the work, first, the surface ship 2 is positioned above the work start position of the pipeline L based on the pipeline map and the GPS device 23. Next, an unmanned submersible (remotely operated vehicle, or ROV; hereinafter also referred to as the ROV) connected to the surface ship 2 by a cable is dropped from the surface ship 2 and remotely operated to be positioned at the work start position of the pipeline L. After the above, the ROV is operated to install a transponder in the vicinity of the work start position on the sea floor, and then the ROV is lifted to the surface ship 2. Finally, the AUV 1 is dropped from the surface ship 2, and the AUV 1 is caused to sail to the work start position based on information obtained by acoustic positioning using a transponder installed in the vicinity of the work start position.

In this manner, after the AUV 1 is positioned at the work start position in the pipeline L, as shown in FIG. 3(A), the inspection device 14 of the AUV 1 inspects the pipeline L while the AUV 1 is caused to sail along the pipeline L. On the other hand, the surface ship 2 navigates above the AUV 1 along the pipeline L based on the pipeline map described above and the information obtained by the GPS device 23. As shown in FIG. 3(A), the surface ship 2 tows the underwater station 3 (Step S2).

After the above, when it becomes necessary to cause the AUV 1 to return to the underwater station 3, the dropping transponder 41 is dropped from the surface ship 2. In the present embodiment, the dropping transponder 41 is dropped based on the remaining battery amount (information) of the battery 16 of the AUV 1, the distance (moving distance) of the portion where the AUV 1 has performed the inspection work in the pipeline L, and the remaining data capacity in which the inspection data can be stored in the storage unit that stores the inspection data acquired by the inspection device 14 (Step S3). Specifically, the dropping transponder 41 is dropped when at least one of the following conditions (i) to (iii) is satisfied:

(i) when the remaining battery amount of the battery 16 of the AUV 1 falls below a set value;

(ii) when the moving distance of the AUV 1 exceeds a predetermined distance; and (iii) when the remaining data capacity in which the inspection data can be stored in the storage unit of the inspection device 14 falls below a set amount.

Specifically, the control device 13 of the AUV 1 monitors the remaining battery amount of the battery 16, the moving distance of the AUV 1, and the remaining data capacity of the storage unit of the inspection device 14. Then, when at least one of the above conditions (i) to (iii) is satisfied, the control device 13 of the AUV 1 sends a signal indicating a work suspension timing of the AUV 1 (hereinafter referred to as the "work suspension signal") to the surface ship 2 either directly or via the underwater station 3. The "moving distance" is the distance for which AUV 1 works along the pipeline L from the work start position, or, in a case where the AUV 1 resumes the work from the work suspended position, the distance for which the AUV 1 works from the work suspended position along the pipeline L.

After receiving the work suspension signal from the AUV 1, as shown in FIG. 3(B), the surface ship 2 drops and sinks the dropping transponder 41 to the bottom of water. In the dropping of the dropping transponder 41, the dropping transponder 41 is dropped into the sea from the deck of the surface ship 2 or the like manually by the crew. However, a dropping device for dropping the dropping transponder 41 may be provided in the surface ship 2, and, in this case, the dropping operation by the dropping device may be automatically executed by the work suspension signal from the AUV 1 or may be executed by manual operation by the crew who knows that the work suspension signal is received.

After the dropping transponder 41 reaches the sea floor, the acoustic positioning device 17 of the AUV 1 stores the work suspended position at which the work for the pipeline L is suspended (to be exact, a position of the transponder 41 with respect to the work suspended position) based on the information obtained by the acoustic positioning using the dropping transponder 41 (Step S4).

The timing at which the acoustic positioning device 17 of the AUV 1 measures the position based on the information obtained by the acoustic positioning using the dropping transponder 41 is not particularly limited.

For example, in Step S3, the AUV 1 may suspend the sailing and the work at a time point at which the AUV 1 sends the work suspension signal to the surface ship 2. In this case, the AUV 1 waits on the spot until the dropping transponder 41 is dropped and reaches the sea floor. Then, after the dropping transponder 41 (more specifically, the weight 42) reaches the sea floor, the acoustic positioning device 17 measures the work suspended position. Note that the dropping transponder 41 is determined to reach the sea floor when the movement of the dropping transponder 41 becomes sufficiently small.

Alternatively, for example, in Step S3, the work suspension signal may be one that notifies in advance that the AUV 1 suspends the sailing and the work. For example, the AUV 1 may suspend the sailing and the work when the AUV 1 sails a predetermined distance from the position where the AUV 1 sends the signal to the surface ship 2, or the AUV 1 may suspend the sailing and the work when the AUV 1 sails for a predetermined time period from the time point at which the AUV 1 sends the signal to the surface ship 2. In this case, after receiving the work suspension signal, the surface ship 2 predicts a position where the AUV 1 suspends the work, and may drop the dropping transponder 41 so that the dropping transponder 41 reaches the bottom at a position as close as possible to the predicted position.

After the work suspended position is stored, as shown in FIG. 3(C), based on the information obtained by the acoustic positioning system configured with the acoustic positioning device 17 of the AUV 1 and the transponder 32 of the underwater station 3, the AUV 1 is caused to sail toward the underwater station 3 as a return destination (Step S5).

Then, as shown in FIG. 3(D), after the AUV 1 is docked to the underwater station 3, the AUV 1 and the underwater station 3 execute operation corresponding to the situation. For example, in a case where the AUV 1 returns to the underwater station due to a battery remaining amount becoming low (in other words, the condition (i) is satisfied), the power feeding device 33 of the underwater station 3 supplies power to the power receiving device 15 of the AUV 1, and the battery 16 is charged. Note that the battery 16 may always be charged in a case where the AUV 1 returns to the underwater station 3. The AUV 1 docked with the underwater station 3 may transmit the work data acquired up to a middle stage of the work to the underwater station 3, or receive, from the underwater station 3, an instruction to the AUV 1 for the next work.

After the charging of the battery 16 is completed, as shown in FIG. 4(A), the AUV 1 is caused to sail from the underwater station 3 to the work suspended position based on the information obtained by the acoustic positioning using the dropping transponder 41. The AUV 1 may search the pipeline while circling around the work suspended position. Then, as shown in FIG. 4(B), the inspection work of the pipeline L is resumed (Step S6).

Note that, in Step S6, in a case where the communication between the acoustic positioning device 17 of the AUV 1 and the dropping transponder 41 is disabled when the AUV 1 is caused to sail from the underwater station 3 to the work suspended position, the AUV 1 is caused to return to the underwater station 3 based on the information obtained by the acoustic positioning between the positioning device 17 of the AUV 1 and the transponder 32 of the underwater station 3 again.

After the AUV 1 resumes the work of the pipeline L, as shown in FIG. 4(C), the dropping transponder 41 is floated on the sea and recovered to the surface ship 2 (Step S7).

Specifically, a predetermined acoustic signal is sent from the surface ship 2 to the separation device provided in the dropping transponder 41. The separation device that receives the acoustic signal separates the weight 42 from the dropping transponder 41. Then, the separation device and the dropping transponder 41 float on the sea due to the buoyancy of the floating body coupled to the dropping transponder 41. A position of the dropping transponder 41 that has floated is, for example, identified based on the information obtained by the acoustic positioning device 24 of the surface ship 2, and the dropping transponder 41 is found by the crew and recovered. However, the configuration for floating the dropping transponder 41 is not limited to that described above.

The above Steps S2 to S7 are repeated until the AUV 1 reaches the work end position in the pipeline L (Step S8: NO). When the AUV 1 reaches the work end position in the pipeline L (Step S8: YES), the pipeline inspection work is finished.

As described above, according to the working method according to the present embodiment, after the dropping transponder 41 is dropped and sunk to the bottom of the water, the work suspended position where the inspection work of the pipeline L is suspended is stored based on the information obtained by the acoustic positioning using the dropping transponder 41, and also the AUV 1 is caused to sail from the underwater station 3 that is the return destination to the vicinity of the work suspended position based on the information obtained by the acoustic positioning using the dropping transponder 41. For this reason, the AUV 1 can be caused to accurately sail from the return destination toward the vicinity of the work suspended position of the work object.

Further, in the present embodiment, the work can be suspended based on the remaining battery amount information of the AUV 1. Accordingly, the work time can be shortened by optimizing the charging timing, and the AUV 1 can be prevented from becoming unable to sail due to a dead battery.

Second Embodiment

Next, the working method according to the second embodiment will be described with reference to FIGS. 5 to 7. The working system that performs the working method according to the present embodiment differs from the working system 100 of the first embodiment in that the surface ship 2 does not tow the underwater station 3. That is, in the present embodiment, the AUV 1 returns to the surface ship 2 instead of returning to the underwater station 3. In the present embodiment and a modification described later, a difference from the working method of the first embodiment will be mainly described, and the same elements as those in the first embodiment will be denoted by the same reference numerals and omitted from the description.

FIG. 5 is a flowchart showing a process of the inspection work of the pipeline L according to the working method according to the present embodiment. FIG. 6 is a schematic diagram explaining a process in which the AUV 1 returns to the surface ship 2 from the work suspended position. FIG. 7 is a schematic diagram for explaining a process in which the AUV 1 sails from the surface ship 2 to the work suspended position and resumes the work.

As shown in FIGS. 6 and 7, the surface ship 2 is provided with a transponder 27. The transponder 27 is for the acoustic positioning device 17 to measure the position of the AUV 1 with respect to the surface ship 2 so that the AUV 1 approaches the surface ship 2.

As shown in FIG. 5, in the working method of the pipeline L according to the present embodiment, the AUV 1 is first positioned at the work start position of the pipeline L as in the first embodiment (Step T1).

After positioning the AUV 1 at the work start position in the pipeline L, as shown in FIG. 6(A), while the AUV 1 is caused to sail along the pipeline L, the work device 14 of the AUV 1 inspects the pipeline L. On the other hand, the surface ship 2 navigates above the AUV 1 along the pipeline L based on the pipeline map described above and the information obtained by the GPS device 23 (Step T2).

After the above, as in the first embodiment, when at least one of the above-described conditions (i) to (iii) is satisfied, the dropping transponder 41 is dropped as shown in FIG. 6(B) (Step T3).

Further, as in the first embodiment, after the dropping transponder 41 reaches the sea floor, the acoustic positioning device 17 of the AUV 1 stores the work suspended position at which the inspection work for the pipeline L is suspended based on the information obtained by the acoustic positioning using the dropping transponder 41 (Step T4).

After the work suspended position is stored, as shown in FIG. 6(C), based on the information obtained by the acoustic positioning system configured with the acoustic positioning device 17 of the AUV 1 and the transponder 27 of the surface ship 2, the AUV 1 is caused to sail toward the surface ship 2. That is, the AUV 1 is floated to the vicinity of the surface ship 2, and then is lifted to the surface ship 2, and the battery 16 is charged (Step T5).

Note that the method of causing the AUV 1 to return to the surface ship 2 is not limited to that described above. For example, the method may be such that a transponder is provided in advance in the AUV 1, and, after the AUV 1 is floated on the sea, the position of the AUV 1 is identified based on the information obtained by the acoustic positioning device 24 provided in the surface ship 2, and the AUV 1 is lifted.

After the charging of the battery 16 is completed, as shown in FIG. 7(A), based on the information obtained by the acoustic positioning using the dropping transponder 41, the AUV 1 dropped from the surface ship 2 is caused to sail to the work suspended position, and, as shown in FIG. 7(B), the inspection work for the pipeline L is resumed (Step T6).

As in the first embodiment, after the AUV 1 resumes the inspection work of the pipeline L, as shown in FIG. 7(C), the dropping transponder 41 is floated on the sea and recovered to the surface ship 2 (Step T7). The above Steps T2 to T7 are repeated until the AUV 1 reaches the work end position in the pipeline L (Step T8: NO). When the AUV 1 reaches the work end position in the pipeline L (Step T8: YES), the pipeline inspection work is finished.

In the present embodiment as well, an effect similar to that in the first embodiment can be obtained.

Other Embodiments

The present invention is not limited to the above-described embodiments, and various modifications can be made without departing from the gist of the present invention.

For example, in the above embodiments, the inspection work of the pipeline L is described as the working method using an AUV. However, the working method using the AUV according to the present invention is not limited to the above inspection work. For example, the working method using an AUV does not need to be an inspection work, and is applicable to work of performing a repair, mending, maintenance, or painting for an work object, such as the pipeline L, or work of performing cleaning, work of creating a bathymetric chart, or the like. The work object has been the submarine pipeline L. However, the work object is not limited to the submarine pipeline L, and may be anything that is located underwater or at the bottom of the water, such as a submarine cable embedded in the sea floor. In a case where the working method using the AUV is applied to work of creating a bathymetric chart, the "work object located underwater or at the bottom of the water" is the sea floor itself.

Further, in the above embodiment, an example in which the surface ship 2 and the underwater station 3 towed by the surface ship 2 are used as the return destination of the AUV 1. However, the return destination of the AUV 1 is not limited to these, and may be, for example, a structure (for example, a water-bottomed underwater station) provided underwater or at the bottom of the water.

Further, the AUV 1 does not need to resume the work from the work suspended position, and only needs to be able to resume the work from the vicinity of the work suspended position. For example, the AUV 1 may resume the work from a position behind (behind in the direction in which the AUV 1 sails along the work object) the work suspended position by a predetermined distance, instead of from the work suspended position. In this manner, an error of the acoustic positioning is absorbed and the work can be performed seamlessly.

Further, in the above embodiment, the dropping transponder 2 is dropped from the surface ship 2. However, the dropping transponder 41 may be dropped from the AUV 1, as shown in FIG. 8. In this case, the dropping transponder 41 can be positioned at a position extremely close to the work suspended position of the AUV 1, and the AUV 1 can be caused to sail from the underwater station 3 or the surface ship 2 to the work suspended position with higher accuracy. Further, the dropping transponder 41 may be dropped from the underwater station 3.

Further, a plurality of the dropping transponders 41 may be dropped and sunk to the bottom of the water. In this case, a plurality of the dropping transponders 41 may be dropped by being ejected or released in directions different from each other from the surface ship 2, or the dropping transponders 2 may be dropped from at least two of the AUV 1 and the underwater station 3. In this case, the acoustic positioning device 17 may measure the position of the AUV 1 based on the distance from each of the transponders 41 obtained from the reaching time of the response wave from each of the transponders 41 (that is, the position of the AUV 1 may be measured by employing an LBL system).

Further, the "acoustic positioning using a (dropping) transponder sunk to the bottom of the water" in the present invention includes acquisition of the distance (information) from the acoustic positioning device 17 to the dropping transponder 41 and the direction (information) of the dropping transponder 41 with respect to the acoustic positioning device 17 by employing the acoustic positioning system in the USBL or SBL system, as well as acquisition of only the distance (information) between the dropping transponder 41 and the acoustic positioning device 17. In this case, the acoustic positioning device 17 may acquire the distance to the dropping transponder 41, and calculate the work suspended position at which the inspection work of the pipeline L is suspended based on the distance, the positional relationship between the dropping transponder 41 and the pipeline L, and/or information acquired from the inertial navigation device provided in the AUV 1, and the like.

Further, in the above embodiment, the dropping transponder 41 is dropped when at least one of the above-described conditions (i) to (iii) is satisfied. However, the timing of dropping the dropping transponder 41 is not limited to this. For example, the control device 13 of the AUV 1 may monitor one or two of the remaining battery amount of the battery 16, the moving distance of the AUV 1, and the remaining data capacity of the storage unit of the inspection device 14. Alternatively, another condition for determining the timing of dropping the dropping transponder 41 may be provided. For example, the configuration may be such that another condition (for example, when an AUV reaches a preset target point) is added to the above conditions (i) to and the dropping transponder 41 is dropped at least one of the conditions is satisfied.

Further, the AUV does not necessarily store the work suspended position. Even in this case, if the transponder is dropped to the vicinity of the work suspended position, the AUV can be caused to sail to the vicinity of the work suspended position by causing the AUV to sail from the return destination to the transponder at the bottom of the water.

Further, in the above-described embodiment, the control device 13 of the AUV 1 determines the timing at which the dropping transponder 41 is dropped (specifically, determines whether or not at least one of the above conditions (i) to (iii) is satisfied). However, the timing for dropping the dropping transponder 41 does not need to be determined on the AUV 1 side. For example, the configuration may be such that the AUV 1 periodically sends the remaining battery amount information and the like to the surface ship 2, and a determination device mounted on the surface ship 2 or the underwater station 3 or the operator on the surface ship 2 determines or decides the timing for dropping the dropping transponder 41 based on the information sent from the AUV 1. In a case where the timing for dropping the dropping transponder 41 is determined or decided in the surface ship 2 or the underwater station 3, the surface ship 2 or the underwater station 3 may send the work suspension signal to the AUV 1 so as to instruct the AUV 1 to suspend the work.

Further, in the above embodiment, the dropping transponder 41 is floated on the water so as to be recovered. However, in the working method of the present invention, the dropping transponder 41 does not need to be floated. For example, in a case where the dropping transponder 41 is dropped from the AUV 1, the AUV 1 may further include a recovery device for recovering the transponder 41 that is dropped.

The AUV may be one that is switchable to an ROV mode or a manual operation mode.

REFERENCE SIGNS LIST

1 AUV (autonomous underwater vehicle)
2 Surface ship
3 Underwater station (return destination)
16 Battery
17 Acoustic positioning device
41 Dropping transponder (transponder)
L Pipeline (work object)

The invention claimed is:

1. A working method using an autonomous underwater vehicle for working on a work object located underwater or at a bottom of water by using the autonomous underwater vehicle while reciprocating the autonomous underwater vehicle between the work object and a return destination, the working method comprising:
   working on the work object with a work device included in the autonomous underwater vehicle while causing the autonomous underwater vehicle to sail along the work object;
   dropping and sinking a transponder to the bottom of water when one of the two following conditions is satisfied:
      (i) a remaining battery amount of the autonomous underwater vehicle falls below a set value; and
      (ii) remaining data capacity that can be stored by the autonomous underwater vehicle falls below a set amount, where work performed by the autonomous underwater vehicle includes storing of predetermined data;
   causing the autonomous underwater vehicle to sail toward the return destination; and
   resuming work on the work object by causing the autonomous underwater vehicle to sail from the return destination to a vicinity of a work suspended position, at which the work on the work object is suspended, based on information obtained by acoustic positioning using the transponder that is sunk to the bottom of water.

2. The working method using an autonomous underwater vehicle according to claim 1, wherein the dropping the transponder is performed toward a vicinity of a position at which the work is scheduled to be suspended or a vicinity of a position at which the work is suspended.

3. The working method using an autonomous underwater vehicle according to claim 1, further comprising storing a work suspended position at which the work on the work object is suspended based on information obtained by acoustic positioning using the transponder that is sunk to the bottom of water, prior to the causing the autonomous underwater vehicle to sail toward the return destination.

4. The working method using an autonomous underwater vehicle according to claim 1, further comprising towing an underwater station by a surface ship that navigates above the autonomous underwater vehicle, wherein
   the underwater station is the return destination, and
   in the dropping the transponder, the transponder is dropped from the surface ship or the underwater station.

5. The working method using an autonomous underwater vehicle according to claim 1, further comprising floating the transponder on the water, after the resuming the work on the work object.

* * * * *